(12) United States Patent
Wu

(10) Patent No.: US 8,731,033 B2
(45) Date of Patent: May 20, 2014

(54) CHANNEL ESTIMATOR AND CHANNEL ESTIMATION METHOD

(75) Inventor: Shan Tsung Wu, Taipei (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1022 days.

(21) Appl. No.: 12/410,781

(22) Filed: Mar. 25, 2009

(65) Prior Publication Data

US 2010/0086014 A1    Apr. 8, 2010

(30) Foreign Application Priority Data

Oct. 2, 2008    (TW) ................................ 97137921 A

(51) Int. Cl.
*H04B 17/00*    (2006.01)
(52) U.S. Cl.
USPC .......................................................... 375/224
(58) Field of Classification Search
USPC .......................................................... 375/224
See application file for complete search history.

(56) References Cited

U.S. PATENT DOCUMENTS

| | | | |
|---|---|---|---|
| 7,804,889 B2* | 9/2010 | Yim et al. ...................... | 375/224 |
| 7,894,331 B2* | 2/2011 | Sadek et al. .................. | 370/210 |
| 2005/0141626 A1* | 6/2005 | Lee et al. ...................... | 375/260 |
| 2008/0273480 A1* | 11/2008 | Chang ........................... | 370/311 |
| 2008/0273481 A1* | 11/2008 | Chang ........................... | 370/311 |
| 2009/0059885 A1* | 3/2009 | Sadek et al. .................. | 370/343 |
| 2009/0161773 A1* | 6/2009 | Rajagopal .................... | 375/260 |
| 2009/0180558 A1* | 7/2009 | Ma et al. ....................... | 375/260 |

* cited by examiner

*Primary Examiner* — Santiago Garcia
(74) *Attorney, Agent, or Firm* — WPAT, PC; Justin King

(57) ABSTRACT

A channel estimator and a channel estimation method are provided. The channel estimator comprises a storage module, for storing a plurality of channel responses of first pilot signals over a plurality of continuous pilot sub-channels, and a plurality of channel responses of second pilot signals over a scatter pilot sub-channel; and a calculation module, for calculating a channel response at a time point without a pilot signal over the scatter pilot sub-channel according to the channel responses of the first pilot signals and the channel responses of the second pilot signals.

8 Claims, 5 Drawing Sheets

CHANNEL ESTIMATOR AND CHANNEL ESTIMATION METHOD

CROSS REFERENCE TO RELATED PATENT APPLICATION

This patent application is based on a Taiwan, R.O.C. patent application No. 097137921 filed on Oct. 2, 2008.

FIELD OF THE INVENTION

The present invention relates to a channel estimator and a channel estimation method. More particularly, the present invention relates to a channel estimator and a channel estimation method for an orthogonal frequency division multiplexing (OFDM) system.

BACKGROUND OF THE INVENTION

In the recent years, accompanied with the fast-developing technology from computerization, networking to the current digitization, operation modes of various industries are inevitably changed as well. Among the changes, digitalization of the media industry is considered as one of the most important and revolutionary tasks that entrepreneurs look into. The associated digital television (DTV), being a center of attention in terms of consumer electronics, is not only a focus in the development of information appliances but also a critical gateway for the Internet to enter the living room of households.

A common DTV adopts Digital Video Broadcasting (DVB) signals of the DVB standards for transmissions of various television signals. The core structure of DVB is an orthogonal frequency division multiplexing (OFDM) modulation system that performs wireless signal transmissions.

In an OFDM system, data is modulated into signals at a transmitting end, and is then transmitted over channels by such as quadrature phase-shift keying (QPSK), quadrature amplitude modulation (QAM) and phase-shift keying (PSK). The OFDM system is capable of supporting large-amount data transmission, and has greater usage flexibility in bandwidth. However, the OFDM system is not entirely flawless; for example, when applied in wireless transmissions, the OFDM system is resulted with timing offset, phase offset, and frequency offset. These issues have great impacts on received signals at the receiving end, and the undesirable effects substantially reduce performance of the OFDM system. In a real environment, channels of the OFDM system are changed along with the environment and time. When transmitted to the receiving end via wireless channel transmission, received signals at the receiving end may be different from the ones from the transmitting end for that the signals are prone to distortion due to changes or interferences of the channels. At the receiving end, in order to recover the received signals from distortion, the effects of the channels need be first estimated accurately; that is, channel estimation need first be performed accurately for recovering the signals transmitted from the transmitting end. A common channel estimation is implemented using pilot signals. More specifically, a plurality of pilot signals are placed in sub-channels of specific frequencies at the transmitting end, and the known pilot signals are then used at the receiving end to calculate channel responses of the sub-channels of the specific frequencies.

FIG. 1 shows a relationship diagram between frequency and time of a DVB signal having pilot signals; note that only partial sub-channels and time points are shown. In FIG. 1, the horizontal axis f represents sub-channels of different frequencies, and the vertical axis t represents different time points. The channel response in a frequency f sub-channel at a time point t is represented as H (frequency f, time t), and the receiving time is from the negative to the positive. For example, a signal received at a time point t=−1 is before a signal received at a time point t=1 and a signal received at a time point t=4. Pilot signals are transmitted over specific frequency sub-channels with DVB signal transmission, and are categorized into at least a continuous pilot signal (CP) and a scatter pilot signal (SP). The continuous pilot signals are placed at all time points over a specific frequency sub-channel (or referred to as a continuous pilot sub-channel). For example, pilot signals are placed at all time points at coordinate axes f=−3 and f=27. The scatter pilot signals are placed at time points intermediately in a specific frequency sub-channel (or referred to as a scatter pilot sub-channel). For example, at the coordinate axis f=0, pilot signals are placed at time points t=−4, 0, 4, and so on. That is, pilot signals are placed at coordinates (−4, 0), (0, 0), (4, 0), and so on. For another example, at f=3, pilot signals are placed at time points t=−5, −1, 3, and so on; that is, the coordinates (−5, 3), (−1, 3), (3, 3), and so on. The transmitting end transmits and the receiving end receives the continuous pilot signals and the scatter pilot signals in compliance with DVB standards. Therefore, the receiving end determines distortion of the DVB signals transmitted through the channels according to the continuous pilot signals and the scatter pilot signals, so as to increase accuracy in recovering the signals. Further, channel frequency responses of the DVB signals at time points without pilot signals in the scatter pilot sub-channels are calculated and estimated.

In a conventional estimation method for channel frequency responses at time points without pilot signals in the scatter pilot sub-channels, a large-amount memory is required for storing more symbols, with overall costs being increased as a result. In addition, the conventional estimation method that uses fixed parameters lowers estimation accuracy to directly affect performance of the receiver.

In view of the above, the invention provides a new channel estimator and a channel estimation method for reducing memory capacity as well as substantially enhancing performance of the channel estimator.

SUMMARY OF THE INVENTION

It is one objective of the invention to provide a channel estimator. The channel estimator comprises a storage module, for storing a plurality of channel responses of first pilot signals over a plurality of continuous pilot sub-channels, and a plurality of channel responses of second pilot signals over a scatter pilot sub-channel; and a calculation module, for calculating a channel response at a time point without a pilot signal over the scatter pilot sub-channel according to the channel responses of the first pilot signals and the channel responses of the second pilot signals.

It is another objective of the invention to provide a channel estimator. The channel estimator comprises a storage module, for storing a plurality of channel responses of scatter pilot signals over a scatter pilot sub-channel; a calculation module, for calculating a channel response calculation result at a time point without a pilot over the scatter pilot sub-channel according to the responses of the scatter pilot signals and a plurality of parameters; wherein, the channel responses of the scatter pilot signals comprise channel responses before and after the time point without a pilot in the scatter pilot sub-channel, and the number of channel responses before the time point is more than or equal to the number of the channel responses after the time point.

It is another objective of the invention to provide a channel estimation method. The channel estimation method comprises steps of storing a plurality of channel responses of first pilot signals over a plurality of continuous pilot sub-channels, and a plurality of channel responses of second pilot signals over a scatter pilot sub-channel; calculating a plurality of parameters according to the channel responses of the first pilot signals; and calculating a channel response at a time point without a pilot signal over the scatter pilot sub-channel according to the channel responses of the second pilot signals and the parameters.

To achieve the above objects, according to the channel estimation method and channel estimator of the invention, channel estimations of DVB signals are performed using OFDM to reduce channel responses of pilot signals stored in the channel estimator, such that operations required are decreased to lower hardware costs of the channel estimator.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
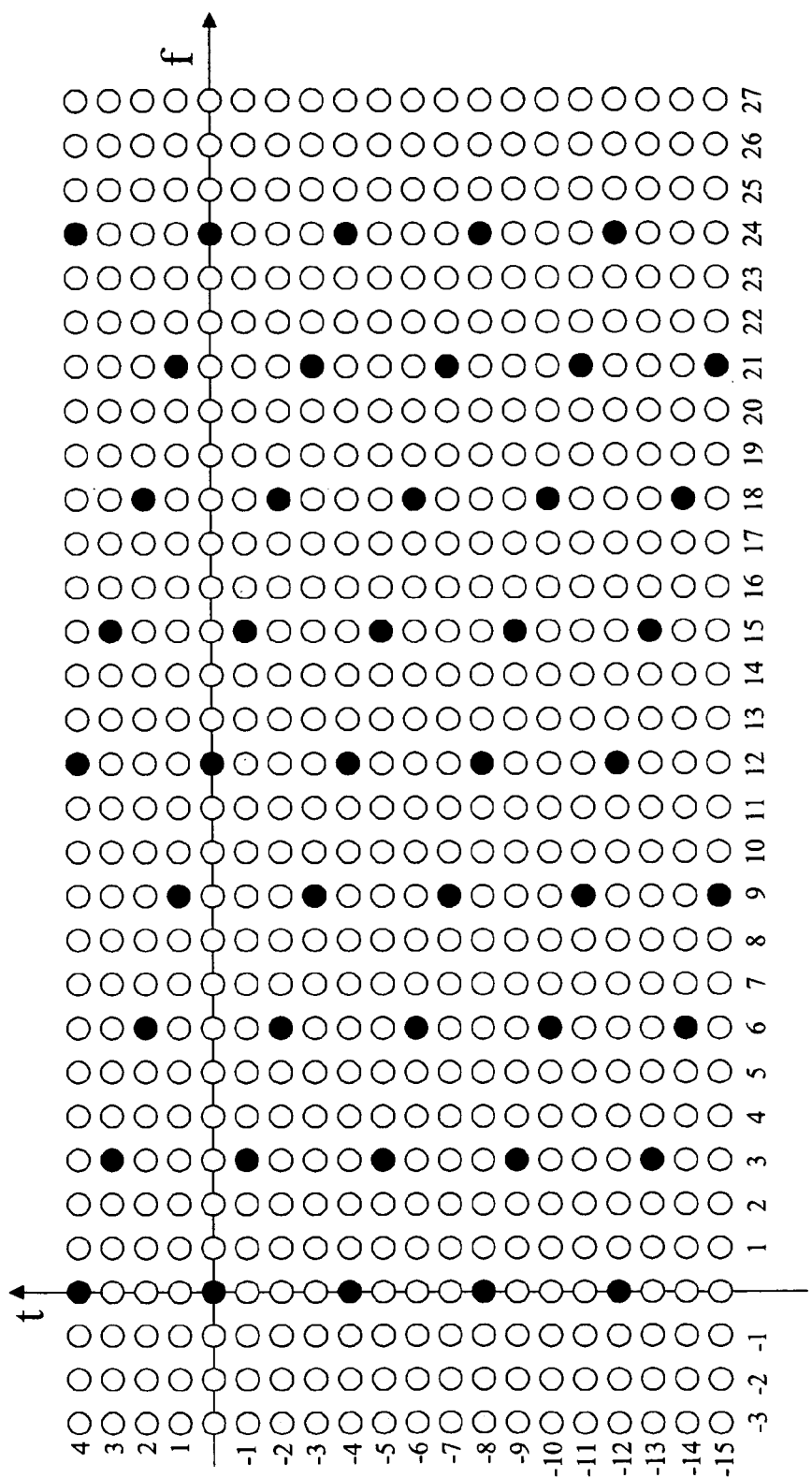
FIG. 1 is a relationship diagram of between channel frequency and time in the prior art.
Figure 2:
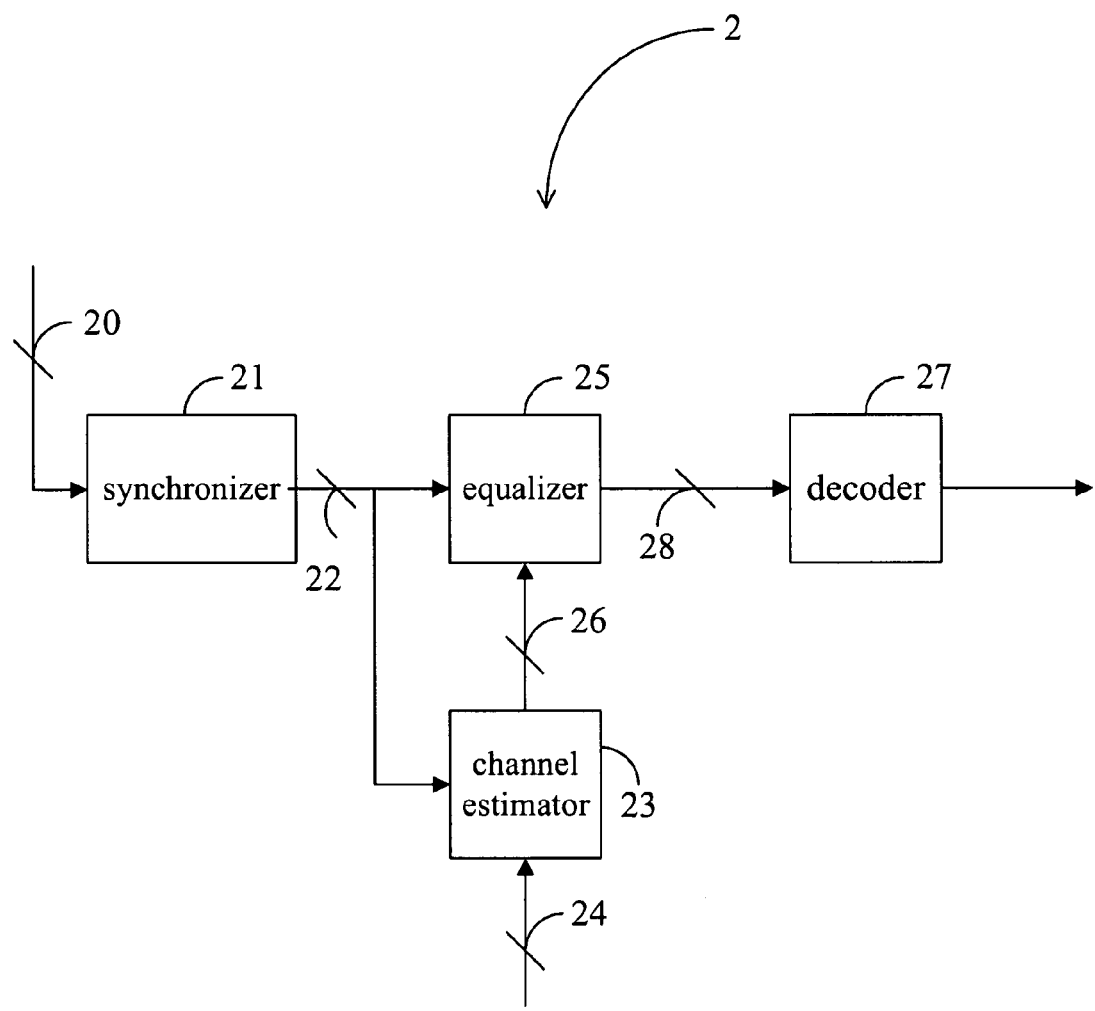
FIG. 2 is a block diagram of a receiver according to the invention.

Refer to FIG. 2 showing a block diagram of a receiver 2 according to the invention. The receiver 2 comprises a synchronizer 21, a channel estimator 23, an equalizer 25 and a decoder 27. The synchronizer 21 receives a wireless signal 20, and transmits a synchronized signal 22 to the equalizer 25 and the channel estimator 23. The receiver 2 may receive, for example, Digital Video Broadcasting-Terrestrial (DVB-T) signals, Digital Video Broadcasting-Satellite (DVB-S) signals, Digital Video Broadcasting-Cable (DVB-C) signals specified by the DVB standards, digital television standards specified by the Advanced Television System Committee (ATSC), or associated digital television standards specified by other standard organizations.

Figure 3:
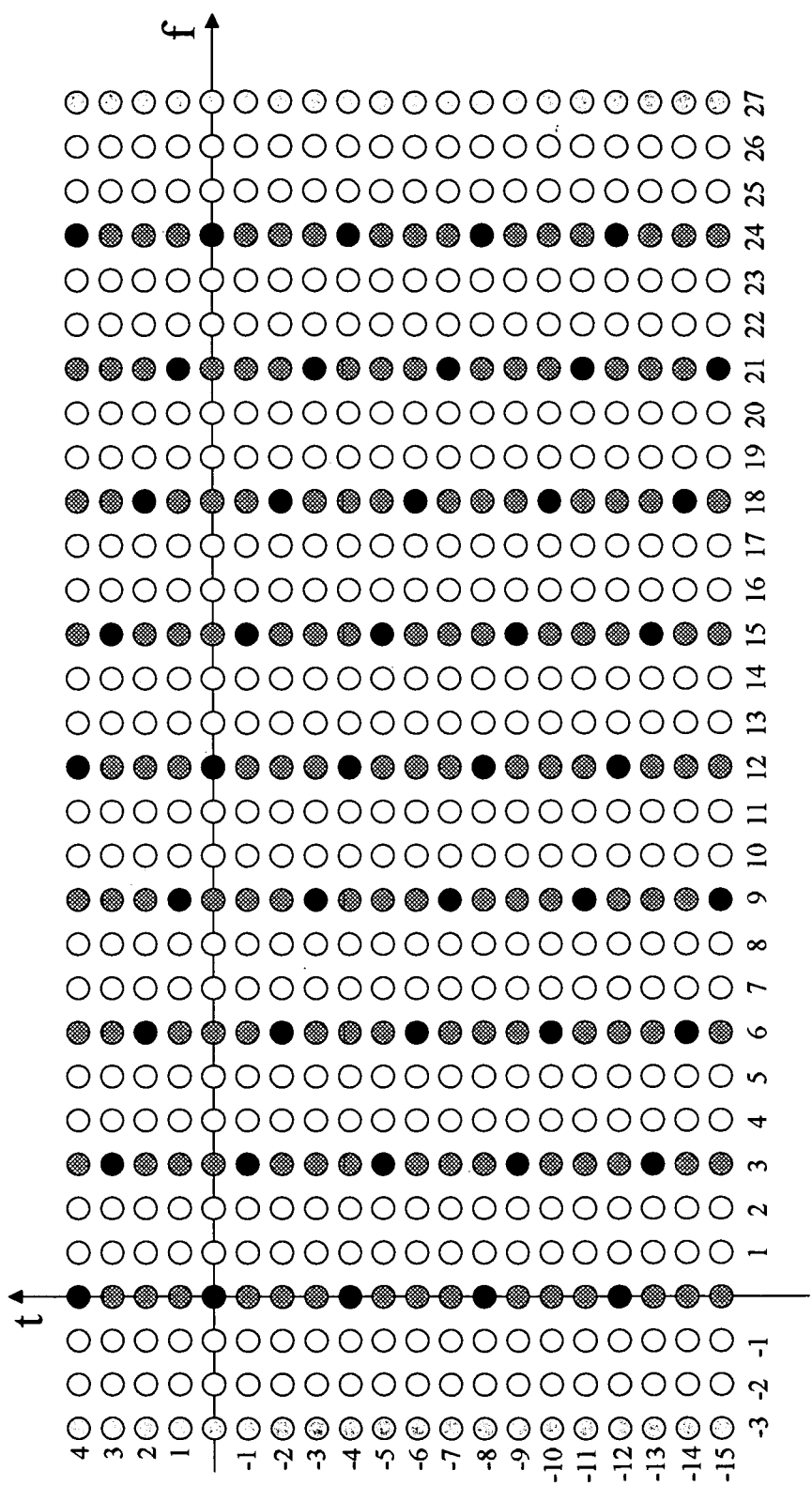
FIG. 3 is a relationship diagram between channel response and time according to the invention.

FIG. 3 shows a relationship diagram between the channel response of the synchronized signal 22 and time. The horizontal axis f represents sub-channels of different frequencies, the vertical axis t represents different time points, and H (frequency f, time t) represents a channel response at a specific time point t in a specific f sub-channel. The synchronized signals 22 comprise a plurality of pilot signals. More specifically, the pilot signals include first pilot signals and second pilot signals. A first pilot signal may be a continuous pilot signal located at such as all time points in f=−3 and f=27 sub-channels, with the frequency responses H(−3, t) and H(27, t) calculated by the channel estimator 23. The second pilot signal may be a scatter pilot signal located at such as all time points t=−4, t=0, t=4 in f=0 sub-channel, with the frequency responses H(0, −4), H(0, 0) and H(0, 4) at the time points time points t=−4, t=0, t=4 in the sub-channel calculated by the channel estimator 23.

The channel estimator 23 according to the invention is for estimating channel responses at time points without pilot signals in a scatter pilot sub-channel. First, the channel estimator 23 receives the synchronized signals 22, and calculates the channel responses of the various pilot signals in the synchronized signals 22 according to known pilot signals 24.

Upon acquiring the channel responses of the various pilot signals in the synchronized signal 22, channel responses 26 at other time points in the pilot sub-channel are estimated. The equalizer 25 receives the channel responses 26 calculated by the channel estimator 23, and uses the same for processing the synchronized signals 22 to generate equalized signals 28. The decoder 27 then receives and processes the equalized signal 28 to generate digital television signals that are removed with transmission channel effects.

Figure 4:
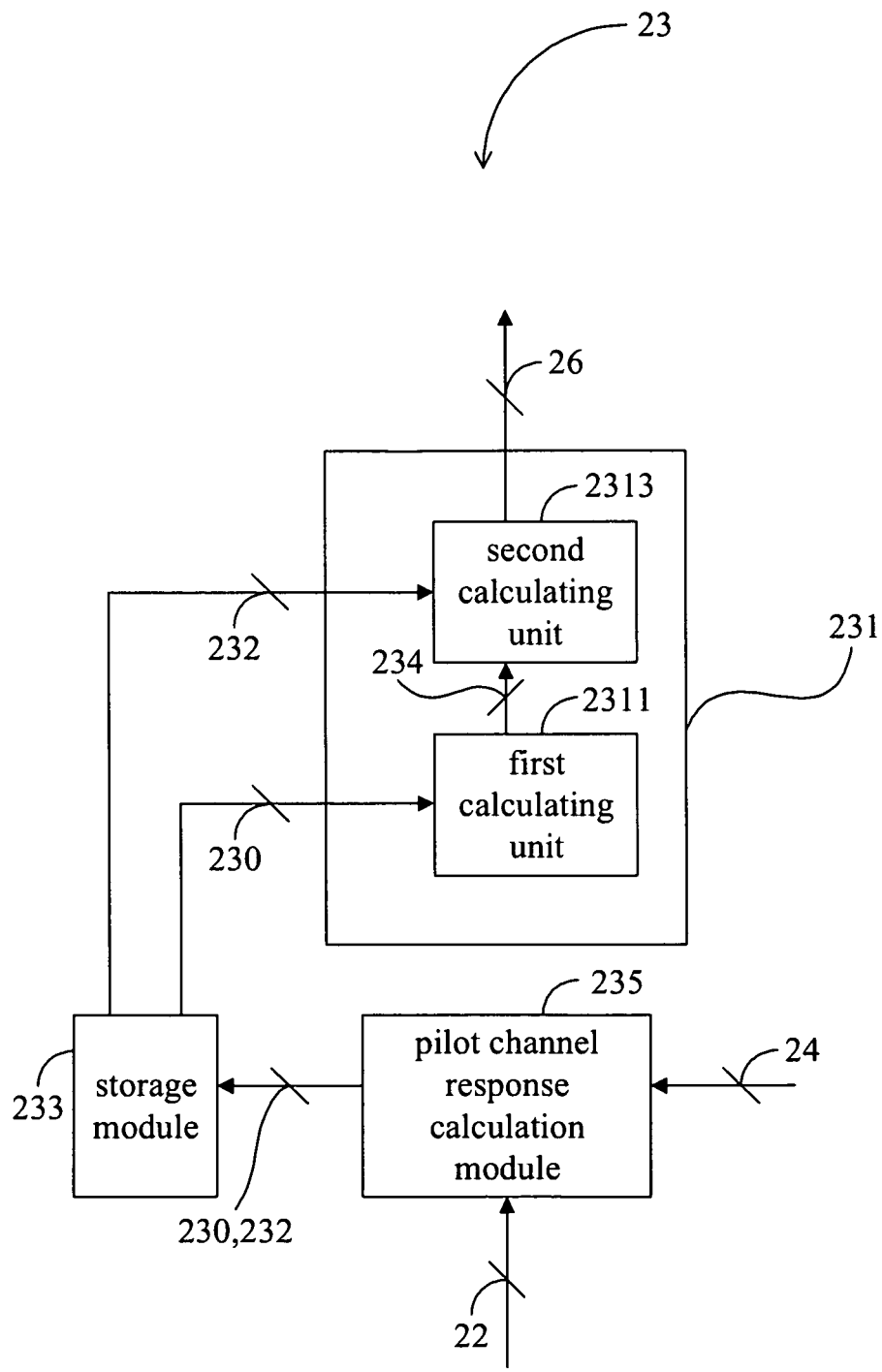
FIG. 4 is a block diagram of a channel estimator according to the invention.

FIG. 4 shows a detailed schematic diagram of the channel estimator 23, which comprises a calculation module 231, a storage module 233, and a pilot channel response calculation module 235. The calculation module 231 further comprises a first calculating unit 2311 and a second calculating unit 2313. The pilot channel effect calculation module 235 receives the synchronized signal 22, and calculates continuous pilot channel responses 230 and scatter pilot channel responses 232 in the synchronized signals 22 according to the known pilot signals 24, followed by storing the continuous pilot channel responses 230 and scatter pilot channel responses 232 into the storage module 233. The known pilot signals including continuous pilots and scatter pilots defined in each standard are known by the transmitter and the receiver and are used for estimating the channel response by the receiver. The first calculating unit 2311 estimates parameters 234 needed by calculating channel responses at other time points in the pilot sub-channel according to the continuous pilot channel responses 230 stored in the storage module 233. Then, the second calculating unit 2313 calculates the channel response 26 of other sub-channels according to the scatter pilot channel responses 232 stored in the storage module 233 and the parameters 234.

In the following section, taking calculations for a channel response at a specific time point over a specific pilot sub-channel for example, the method of channel estimation according to the invention shall be discussed. In continuation of the foregoing description, the pilot channel response calculation module 235 of the channel estimator 23 calculates the continuous pilot channel responses 230 and the scatter pilot channel response 232 according to the synchronized signal 22 and the known pilot signals 24. For example, the continuous pilot signals are located at all time points in the f=−3 and f=27 sub-channels, and the channel responses H(−3, t) and H(27, t) of the sub-channels may be calculated. The scatter pilot signals are located at time points t=−4, t=0, t=4 over the frequency f=0 sub-channel, and the channel responses H(0, −4), H(0, 0), and H(0, 4) may be calculated. The channel response of the pilot signal is as below:

$$H(f, t) = \frac{y(f, t)}{x(f, t)}$$

Wherein, H(f, t) represents the channel response at a time point t over a frequency f sub-channel, y(f, t) represents the synchronized signal 22 at a time point t over a frequency f sub-channel, and x (f, t) represents the known pilot signal 24 at a time point t in a frequency f sub-channel.

Note that channel responses at other time points over the scatter pilot sub-channels, e.g., the frequency responses H(0, 1), H(0, 2) and H(0, 3) at the time points t=1, 2, 3 in the frequency f=0 sub-channel, or the frequency responses H(3, 1), H(3, 2) and H(3, 3) at the time points t=1, 2, 3 in the frequency f=3 sub-channel, are calculated on basis of estimation. For example, when the channel estimator 23 is to estimate the channel response at the time point t=0 over the frequency f=9 pilot sub-channel, since this time point is not placed with a pilot signal, the channel response cannot be directly calculated by the pilot channel response calculation module 235; instead, the channel response is determined by the second calculating unit 2313 of the channel estimator 23 according to the equation below:

$$H(9,0)=c(9,1)*H(9,1)+c(9,-3)*H(9,-3)+c(9,-7)*H(9,-7)+c(9,-11)*H(9,-11)$$

Wherein, H(9, 0), representing the channel response, i.e., the channel response to be detected, at the time point t=0 in the frequency f=9 pilot sub-channel, is an estimation result to be generated by the channel estimator according to the invention; H(9, 1), H(9, −3), H(9, −7) and H(9, −11), representing the four channel responses at the time points t=1, −3, −7, −9 in the frequency f=9 pilot sub-channel, respectively, are calculated by the pilot channel response calculation module 235; and the four parameters c(9, 1), c(9, −3), c(9, −7) and c(9, −11), representing parameters needed by estimation of the channel response at the time point t=0 in the frequency f=9 pilot sub-channel, are calculated by the second calculating unit 2313 of the channel estimator 23, wherein the calculation is to be described later. From the above equation, it is concluded that, in order to obtain the channel response H(9, 0) at the time point t=0 in the frequency f=9 pilot sub-channel, channel responses, e.g., H(9, 1), H(9, −3), H(9, −7) and H(9, −11), of partial scatter pilot signals in the frequency f=9 pilot sub-channel, are needed. The scatter pilot signals are received before or after the time point t=0. Further, the number of the received pilot signals before the time point t=0 is not less than that of the received after the time point t=0, and the channel responses are not limited to the channel responses of the four pilot signals as in this invention.

The equation below represents a parameter of c(9, 1), c(9, −3), c(9, −7) and c(9, −11) corresponding to H(9, 1), H(9, −3), H(9, −7) and H(9, −11):

$$h=HC$$

Wherein, h, H and C are represented by the following equations, respectively:

$$h = \begin{bmatrix} H(CP_1, 0) \\ H(CP_2, 0) \\ \vdots \\ H(CP_n, 0) \end{bmatrix}$$

$$c = \begin{bmatrix} c(9, 1) \\ c(9, -3) \\ c(9, -7) \\ c(9, -11) \end{bmatrix}$$

$$H = \begin{bmatrix} H(CP_1, 1) & H(CP_1, -3) & H(CP_1, -7) & H(CP_1, -11) \\ H(CP_2, 1) & H(CP_2, -3) & H(CP_2, -7) & H(CP_2, -11) \\ \vdots & \vdots & \vdots & \vdots \\ H(CP_n, 1) & H(CP_n, -3) & H(CP_n, -7) & H(CP_n, -11) \end{bmatrix}$$

Wherein, the frequency f=$CP_1$ to frequency f=CPn are n continuous pilot sub-channels of difference frequencies; H($CP_1$, 0) to H(CPn, 0) represent channel responses of the n continuous pilot sub-channels at the time point t=0, which is the time point of the channel response H(9, 0) to be estimated; H($CP_1$, 1,) to H(CPn, 1) represent channel responses of n continuous pilot sub-channels at the time point t=1, which corresponds to the time point of the H(9, 1) scatter pilot signal; and significations of H($CP_1$, −3) to H(CPn, −3), H($CP_1$, −7) to H(CPn,−7) and H($CP_1$, −11) to H(CPn, −11) are obtained similarly.

The first calculating unit 2311 of the channel estimator 23 according to the invention determines the foregoing parameters using the least-square method (LSM):

$$C=C_{LS}=(H*H)^{-1}H**h$$

Wherein, * represents the conjugate transpose, and ( )$^{-1}$ represents the inverse. Using the above equation, the parameter of c(9, 1), c(9, −3), c(9, −7) and c(9, −11) may be obtained.

The second calculating unit 2313, according to H(9, 1), H(9, −3), H(9, −7) and H(9, −11) obtained by the pilot channel response calculation module 235, and c(9, 1), c(9, −3), c(9, −7) and c(9, −11) obtained by the first calculating unit 2311, calculates the channel response H(9, 0) (i.e., the channel response to be detected) at the time point t=0 in the frequency f=9 pilot sub-channel.

Similarly, the channel estimator 23 according to the invention implements the same calculations for obtaining the channel responses at all time points without the pilot signal in all scatter pilot sub-channels, e.g., frequency f=3, 6, 9 . . . scatter sub-channels.

The invention also provides a channel estimation method for use in the aforesaid channel estimator 23.

Figure 5:
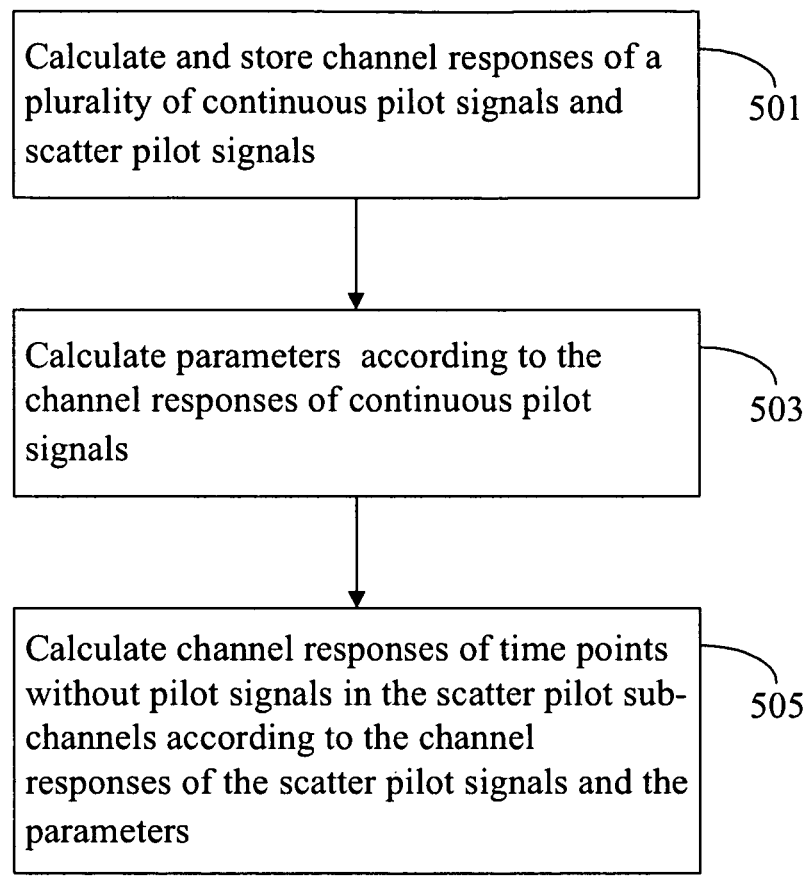
FIG. 5 is a flowchart of a channel estimation method according to the invention.

More specifically, the channel estimation method is implemented through controlling various modules of the channel estimator 23 using an application program. Refer to FIG. 5 showing a corresponding flowchart of the channel estimation method.

In Step 501, a DVB signal is received. According to continuous pilot signals and scatter pilot signals, channel responses of a plurality of continuous pilot signals and scatter pilot signals are calculated and stored. In Step 503, using LSM, a plurality of parameters are calculated according to the responses of the plurality of continuous pilot signals. In Step 505, channel responses of time points without scatter pilot signals over the scatter pilot sub-channels are calculated according to the channel responses of the received scatter pilot signals and the parameters.

Apart from the above steps, the channel estimator 23 according to the invention is also capable of performing normal operations and functions of a conventional estimator. For a personal having ordinary skill in the art, conventional operations and functions of the channel estimator 23 are easily appreciated and shall not be described for brevity.

Therefore, according to the channel estimator and the channel estimation method of the invention, channel estimations of DVB signals are performed to reduce the number of symbols stored in a receiver, such that the capacity of memory required is decreased to lower hardware costs of the receiver and the channel estimator. Further, parameters used by the channel estimator according to the invention are obtained based on dynamic estimation to more accurately estimate channel responses at time points without pilot signals in scatter pilot sub-channels.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A channel estimator, comprising:
    a storage module, for storing a plurality of first channel responses of first pilot signals over a plurality of continuous pilot sub-channels, and for storing a plurality of second channel responses of second pilot signals over a scatter pilot sub-channel; and
    a calculation module, for calculating a third channel response at a time point with no second pilot signal over the scatter pilot sub-channel according to the first channel responses of the first pilot signals and the second channel responses of the second pilot signals; wherein the second channel responses of the second pilot signals comprise channel responses of the second pilot signals before and after the time point with no second pilot signal in the scatter pilot sub-channel, and a number of the channel responses of the second pilot signals before the time point is more than a number of the channel responses of the second pilot signals after the time point and wherein a plurality of parameters are calculated according to the first channel responses of the first pilot signals using a least-square method between a matrix of first channel responses at said time point, and a matrix of first channel responses at time points corresponding to said second channel responses.

2. The channel estimator as claimed in claim 1, wherein the calculation module comprises:
    a first calculating unit, for calculating the plurality of parameters according to the first channel responses of the first pilot signals; and
    a second calculating unit, for calculating the third channel response at the time point with no second pilot signal over the scatter pilot sub-channel according.

3. The channel estimator as claimed in claim 1, further comprising:
    a pilot channel response calculation module, for calculating the first channel responses of the first pilot signals and the second channel responses of the second pilot signals according to Digital Video Broadcast (DVB) signals.

4. A channel estimator, comprising:
    a storage module, for storing a plurality of first channel responses of scatter pilot signals over a scatter pilot sub-channel;
    a calculation module, for calculating a second channel response calculation result at a time point with no scatter pilot signal over the scatter pilot sub-channel according to the first responses of the scatter pilot signals and a plurality of parameters;
    wherein, the first channel responses of the scatter pilot signals comprise channel responses of the second pilot signals before and after the time point over the scatter pilot sub-channel, and a number of first channel responses of the second pilot signals before the time point is more than a number of the first channel responses of the second pilot signals after the time point and wherein the plurality of parameters are calculated according to the first channel responses of the first pilot signals using a least-square method between a matrix of first channel responses at said time point, and a matrix of first channel responses at time points corresponding to said second channel responses.

5. The channel estimator as claimed in claim 4, wherein the parameters are calculated according to a plurality of third channel responses of continuous pilot signals over a plurality of continuous pilot sub-channels.

6. The channel estimator as claimed in claim 5, further comprising:
    a pilot channel response calculation module, for calculating the third channel responses of the continuous pilot signals and the first channel responses of the scatter pilot signals according to DVB signals.

7. A channel estimation method, comprising steps of:
    storing a plurality of first channel responses of first pilot signals over a plurality of continuous pilot sub-channels, and storing a plurality of second channel responses of second pilot signals over a scatter pilot sub-channel;
    calculating a plurality of parameters according to the first channel responses of the first pilot signals; and
    calculating a third channel response at a time point without the second pilot signal over the scatter pilot sub-channel according to the second channel responses of the second pilot signals and the parameters;
    wherein the second channel responses of the second pilot signals comprise channel responses of the second pilot signals before and after the time point with no second pilot signal in the scatter pilot sub-channel, and a number of the channel responses of the second pilot signals before the time point is more than a number of the channel responses of the second pilot signals after the time point and wherein the step of calculating the plurality of parameters according to the first channel responses of the first pilot signals further comprises a step of: calculating the parameters using a least-square method between a matrix of first channel responses at said time point, and a matrix of first channel responses at time points corresponding to said second channel responses.

8. The channel estimation method as claimed in claim 7, wherein the first pilot sub-channels are a plurality of continuous pilot sub-channels, and the second pilot sub-channels are a scatter pilot sub-channel.

* * * * *